(12) United States Patent
Watanabe

(10) Patent No.: US 11,155,669 B2
(45) Date of Patent: Oct. 26, 2021

(54) CURABLE RESIN COMPOSITION, CURED PRODUCT THEREOF, AND BONDED BODY BONDED BY CURED PRODUCT

(71) Applicant: THREEBOND CO., LTD., Tokyo (JP)

(72) Inventor: Kentaro Watanabe, Tokyo (JP)

(73) Assignee: THREEBOND CO., LTD., Tokyo (JP)

( * ) Notice: Subject to any disclaimer, the term of this patent is extended or adjusted under 35 U.S.C. 154(b) by 162 days.

(21) Appl. No.: 16/330,894

(22) PCT Filed: Sep. 5, 2017

(86) PCT No.: PCT/JP2017/031974
§ 371 (c)(1),
(2) Date: Mar. 6, 2019

(87) PCT Pub. No.: WO2018/061658
PCT Pub. Date: Apr. 5, 2018

(65) Prior Publication Data
US 2019/0211132 A1    Jul. 11, 2019

(30) Foreign Application Priority Data

Sep. 27, 2016    (JP) .............................. JP2016-187668

(51) Int. Cl.
*C08G 18/10*    (2006.01)
*C08G 18/32*    (2006.01)
(Continued)

(52) U.S. Cl.
CPC ................ *C08G 18/10* (2013.01); *B32B 7/12* (2013.01); *B32B 9/005* (2013.01); *B32B 9/041* (2013.01); *B32B 9/045* (2013.01); *B32B 15/082* (2013.01); *B32B 15/085* (2013.01); *B32B 15/088* (2013.01); *B32B 15/09* (2013.01); *B32B 15/18* (2013.01); *B32B 15/20* (2013.01); *B32B 17/06* (2013.01); *B32B 27/00* (2013.01); *B32B 27/08* (2013.01); *B32B 27/281* (2013.01); *B32B 27/285* (2013.01); *B32B 27/286* (2013.01); *B32B 27/288* (2013.01); *B32B 27/30* (2013.01); *B32B 27/308* (2013.01); *B32B 27/32* (2013.01); *B32B 27/34* (2013.01); *B32B 27/36* (2013.01); *B32B 27/365* (2013.01); *B32B 27/40* (2013.01); *C08G 18/00* (2013.01); *C08G 18/18* (2013.01); *C08G 18/32* (2013.01); *C08G 18/3203* (2013.01); *C08G 18/34* (2013.01); *C08G 18/36* (2013.01); *C08G 18/44* (2013.01); *C08G 18/7621* (2013.01); *C08G 18/7671* (2013.01);
(Continued)

(58) Field of Classification Search
CPC .... C08G 18/10; C08G 18/7621; C08G 18/44; C08G 18/00; C08G 18/36; C08G 18/7671; C08G 18/32; C08G 18/3203; C08G 18/18; C08G 18/34; B32B 27/10; B32B 27/30; B32B 27/40; B32B 2305/72; B32B 17/06; B32B 2457/10; B32B 15/082; B32B 27/32; B32B 7/12; B32B 2307/748; B32B 2551/00; B32B 2250/02; B32B 27/288; B32B 27/08; B32B 15/085; B32B 2605/00; B32B 2250/244; B32B 2457/00; B32B 15/18; B32B 9/045; B32B 27/365; B32B 27/36; B32B 27/281; B32B 15/20; B32B 27/34; B32B 15/09; B32B 27/308; B32B 27/285; B32B 27/286; B32B 15/088; B32B 9/041; B32B 9/005; B32B 27/00; C08L 79/02; C08L 33/14; C08L 63/00; C08L 33/10; C08L 83/14; C08K 2305/72; C08K 5/24; C09J 183/14
See application file for complete search history.

(56) References Cited

U.S. PATENT DOCUMENTS 3,391,054 A * 7/1968 Lewis et al. ........... C08G 18/86
                                                    428/425.5
5,232,982 A    8/1993 Lucas
(Continued)

FOREIGN PATENT DOCUMENTS

CN    102459393 A    5/2012
JP    S63-142329 A    6/1988
(Continued)

OTHER PUBLICATIONS

International Search Report with English translation and Written Opinion dated Dec. 26, 2017 in corresponding International Application No. PCT/JP2017/031974; 11 pages.
Japanese Office Action dated Apr. 13, 2021, in connection with corresponding JP Application No. 2018-542052 (6 pp., including machine-generated English translation).
Chinese Office Action dated Apr. 9, 2021, in connection with corresponding CN Application No. 201780059269.9 (8 pp., including machine-generated English translation).
(Continued)

*Primary Examiner* — Rabon A Sergent
(74) *Attorney, Agent, or Firm* — Maier & Maier, PLLC

(57) ABSTRACT

A manner for improving storage stability of a curable resin composition and close adhesion of a cured product to a polycarbonate. The present description relates to a curable resin composition including the following components (A) to (C): component (A): an isocyanate group-containing urethane prepolymer, component (B): a powder of a polyamine compound which is solid at 25° C., and component (C): at least one selected from the group consisting of a monofunctional (meth)acrylate compound having an alicyclic structure or a monofunctional (meth)acrylate compound having an aromatic ring, a monofunctional (meth)acrylate compound having a hydrolyzable silyl group, and a polyfunctional (meth)acrylate compound, where the composition does not substantially include a photoradical initiator.

12 Claims, No Drawings

(51) Int. Cl.

| | |
|---|---|
| *C08L 79/02* | (2006.01) |
| *C08L 33/14* | (2006.01) |
| *C08L 63/00* | (2006.01) |
| *B32B 27/30* | (2006.01) |
| *B32B 27/40* | (2006.01) |
| *C08L 33/10* | (2006.01) |
| *B32B 27/00* | (2006.01) |
| *C08G 18/76* | (2006.01) |
| *C08G 18/44* | (2006.01) |
| *C08G 18/00* | (2006.01) |
| *C08G 18/36* | (2006.01) |
| *B32B 27/28* | (2006.01) |
| *B32B 9/04* | (2006.01) |
| *B32B 15/20* | (2006.01) |
| *C08G 18/34* | (2006.01) |
| *B32B 17/06* | (2006.01) |
| *B32B 9/00* | (2006.01) |
| *B32B 27/34* | (2006.01) |
| *B32B 15/18* | (2006.01) |
| *B32B 27/36* | (2006.01) |
| *C08L 83/14* | (2006.01) |
| *B32B 15/09* | (2006.01) |
| *B32B 15/085* | (2006.01) |
| *B32B 27/32* | (2006.01) |
| *B32B 15/082* | (2006.01) |
| *C08G 18/18* | (2006.01) |
| *B32B 15/088* | (2006.01) |
| *B32B 7/12* | (2006.01) |
| *C09J 183/14* | (2006.01) |
| *B32B 27/08* | (2006.01) |
| *C08K 5/24* | (2006.01) |

(52) U.S. Cl.
CPC ............. *C08L 33/10* (2013.01); *C08L 33/14* (2013.01); *C08L 63/00* (2013.01); *C08L 79/02* (2013.01); *C08L 83/14* (2013.01); *C09J 183/14* (2013.01); *B32B 2250/02* (2013.01); *B32B 2250/244* (2013.01); *B32B 2305/72* (2013.01); *B32B 2307/748* (2013.01); *B32B 2457/00* (2013.01); *B32B 2457/10* (2013.01); *B32B 2551/00* (2013.01); *B32B 2605/00* (2013.01); *C08K 5/24* (2013.01)

(56) References Cited

U.S. PATENT DOCUMENTS

| | | |
|---|---|---|
| 5,866,668 A | 2/1999 | Maeda et al. |
| 2012/0082853 A1 | 4/2012 | Maeda et al. |
| 2017/0320996 A1 | 11/2017 | Matsuki et al. |

FOREIGN PATENT DOCUMENTS

| | | |
|---|---|---|
| JP | S63142329 A | 6/1988 |
| JP | H05-032948 A | 2/1993 |
| JP | H06-017027 A | 1/1994 |
| JP | 2014-159560 A | 9/2014 |
| JP | 2014159560 A | 9/2014 |
| TW | 201105746 A | 2/2011 |
| WO | 1995/26374 A1 | 10/1995 |
| WO | 2016/076193 A1 | 5/2016 |
| WO | 2016076193 A1 | 5/2016 |

OTHER PUBLICATIONS

Office Action dated Dec. 4, 2020 in corresponding Chinese Application No. 201780059269; 9 pages including English-language translation.

Taiwanese Office Action dated Jun. 23, 2021, in connection with corresponding TW Application No. 106131262 (10 pp., including machine-generated English translation).

* cited by examiner

CURABLE RESIN COMPOSITION, CURED PRODUCT THEREOF, AND BONDED BODY BONDED BY CURED PRODUCT

FIELD

The present invention relates to a curable resin composition having both excellent storage stability and high close adhesion of a cured product to a polycarbonate, a cured product thereof, and a bonded body bonded by the cured product.

BACKGROUND

Conventionally, a one-liquid type curable resin composition which is obtained by dispersing or mixing polyamine powder, which is solid at room temperature as a curing agent in or with a compound having two or more isocyanate groups in one molecule, is known. In addition, it is known that since in a composition including polyamine powder and a compound having an isocyanate group, the polyamine powder is dissolved by heating to a melting point or more to react with an isocyanate group, the compound including polyamine powder and a compound having an isocyanate group is useful as a thermocurable resin composition.

However, when the polyamine powder was added to the compound having an isocyanate group as it is, it was difficult to make the composition including polyamine powder and a compound having an isocyanate group become a one-liquid practically as a curable resin composition, due to the decreased storage stability by increasing viscosity and gelation.

Thus, in order to improve storage stability of the composition including polyamine powder and a compound having an isocyanate group, a method of dispersing and mixing surface-treated polyamine powder in or with a compound having an isocyanate group has been suggested. For example, JP 5-32948 A discloses that storage stability can be maintained by a curable resin composition including polyamine powder treated with liquid paraffin and an isocyanate group-terminated prepolymer. In addition, WO 95/026374 (corresponding to the specification of U.S. Pat. No. 5,866,668) discloses that storage stability can be maintained by a curable resin composition using fine powdery amine having inorganic fine powder or organic fine powder fixed on the surface and an isocyanate group-terminated prepolymer.

SUMMARY

Recently, polycarbonates are used in cases of electronic mobile devices such as a mobile phone and a multifunctional mobile phone, a functional film such as a polarizing plate, a display such as an image display device, a substrate of a cover panel, and the like, since the polycarbonate has excellent impact resistance and thermal resistance. Thus, in a curable resin composition also, excellent close adhesion of a cured product to a polycarbonate is increasingly required. However, the curable resin compositions disclosed in JP 5-32948 A and WO 95/026374 have excellent storage stability, but have a problem of poor close adhesion of a cured product to a polycarbonate.

The present invention has been made in view of the above circumstance, and the object of the present invention is to provide means to allow a curable resin composition to have both excellent storage stability and high close adhesion of a cured product to a polycarbonate.

The above object is solved by the following means.

[1] A curable resin composition including the following components (A) to (C):

component (A): an isocyanate group-containing urethane prepolymer, component (B): a powder of a polyamine compound which is solid at 25° C., and component (C): at least one selected from the group consisting of a monofunctional (meth)acrylate compound having an alicyclic structure, a monofunctional (meth)acrylate compound having an aromatic ring, a monofunctional (meth)acrylate compound having a hydrolyzable silyl group, and a polyfunctional (meth)acrylate compound, wherein the composition does not substantially include a photoradical initiator.

[2] The curable resin composition described in [1], wherein the component (A) is an isocyanate group-containing urethane prepolymer obtained by reacting a polyol compound (a-1) and a polyisocyanate compound (a-2).

[3] The curable resin composition described in [1] or [2], wherein the component (B) has an average particle diameter of 0.1 to 100 μm.

[4] The curable resin composition described in any one of [1] to [3], wherein the component (B) is at least one compound selected from the group consisting of an aliphatic polyamine compound, an alicyclic polyamine compound, an aromatic polyamine compound, and a hydrazide compound.

[5] The curable resin composition described in any one of [1] to [4], wherein the component (B) is included at 0.1 to 100 parts by mass, based on 100 parts by mass of the component (A).

[6] The curable resin composition described in any one of [1] to [5], further including a compound having a glycidyl group as a component (D).

[7] A cured product of the curable resin composition described in any one of [1] to [6].

[8] A bonded body, wherein a first adherend, the cured product described in [7], and a second adherend are laminated in this order, and at the same time, surfaces of the first adherend and the second adherend and surfaces of the cured product are adhered to each other.

DETAILED DESCRIPTION

Hereinafter, preferred embodiments of the present invention will be described. In the present specification, "X to Y" indicating a range refers to "X or more and Y or less". In addition, unless otherwise stated, operation, physical properties and the like are measured under the condition of room temperature (20 to 25° C.)/relative humidity of 40 to 50% RH.

A first embodiment of the present invention relates to a curable resin composition including the following components (A) to (C):

component (A): an isocyanate group-containing urethane prepolymer, component (B): a powder of a polyamine compound which is solid at 25° C., and component (C): at least one selected from the group consisting of a monofunctional (meth)acrylate compound having an alicyclic structure, a monofunctional (meth)acrylate compound having an aromatic ring, a monofunctional (meth)acrylate compound having a hydrolyzable silyl group, and a polyfunctional (meth)acrylate compound, wherein the composition does not substantially include a photoradical initiator.

According to one embodiment of the present invention, means which can improve storage stability of the curable resin composition and close adhesion of a cured product to a polycarbonate is provided.

Hereinafter, the present invention will be described in detail.

<Component (A)>

The curable resin composition according to the first embodiment of the present invention includes an isocyanate group-containing urethane prepolymer as a component (A).

The component (A) is not particularly limited as long as it is an isocyanate group-containing urethane prepolymer. Though not particularly limited thereto, the component (A) may be for example, an isocyanate group-containing urethane prepolymer obtained by reacting a polyol compound (a-1) and a polyisocyanate compound (a-2), or the like, as a preferred example. That is, it is preferred that the component (A) is a reaction product of the polyol compound (a-1) and the polyisocyanate compound (a-2). In addition, the reaction product may be used alone or in combination of two or more.

A synthesis method of the isocyanate group-containing urethane prepolymer is not particularly limited, however, for example, the isocyanate group-containing urethane prepolymer can be produced by reacting the component (a-2) with the component (a-1) so that an equivalent ratio of isocyanate group/hydroxyl group is 1.2 to 3.5, with respect to the component (a-1).

A reaction condition is not particularly limited, however, in the case of no solvent and no catalyst, it is preferred that stirring is performed at a reaction temperature of usually 20° C. to 90° C., preferably 30° C. to 80° C., and more preferably 40° C. to 60° C. for a reaction time of 1 to 24 hours, preferably 3 to 16 hours, and more preferably 6 to 8 hours.

In addition, if necessary, a solvent may be used, and a catalyst may be used. When the solvent or the catalyst is used, a reaction time and a reaction temperature may be appropriately set depending on the type, and though not particularly limited, the same condition as the no solvent and no catalyst condition may be used. Here, though not particularly limited thereto, the solvent may be for example, ethyl acetate, toluene, xylene, or the like. In addition, though not particularly limited thereto, the catalyst may be for example, lead oleate, tetrabutyltin, antimony trichloride, triphenylaluminum, trioctylaluminum, dibutyltin dilaurate, titanium-based catalysts such as titanium alkoxide, copper naphthenate, zinc naphthenate, zinc octylate, zinc octenate, zirconium naphthenate, cobalt naphthenate, tetra-n-butyl-1, 3-diacetyloxydistannoxane, triethylamine, 1,4-diaza[2,2,2]bicyclooctane, N-ethyl morpholine, or the like. Among these catalyst, from the viewpoint of higher activity, dibutyltin dilaurate, zinc naphthenate, zinc octylate, and zinc octenate are preferably used. In addition, these solvents and catalyst may be used alone or in combination of two or more.

Viscosity of the isocyanate group-containing urethane prepolymer of the component (A) at 25° C. is not particularly limited, however, from the viewpoint of coating workability of the composition, the viscosity is preferably 1 to 2000 Pa·s, more preferably 1 to 1800 Pa·s, and more preferably 1 to 1500 Pa·s. The viscosity can be measured using a cone plate type viscometer at 25° C.

(Component (a-1))

A polyol compound in the component (a-1) refers to a compound having two or more hydroxyl groups in one molecule. Though not particularly limited thereto, the polyol compound may be for example, a polyether polyol, a polyester polyol, a castor oil-based polyol, a hydrogenated castor oil-based polyol, a polycarbonate polyol, a polybutadiene polyol, a polyisoprene polyol, a hydrogenated polyisoprene polyol, or the like. In addition, among them, from the viewpoint of excellent close adhesive force with a polycarbonate (PC), a castor oil-based polyol, a hydrogenated castor oil-based polyol, a polycarbonate polyol, a polyisoprene polyol, and hydrogenated polyisoprene polyol are preferred, and a castor oil-based polyol, a hydrogenated castor oil-based polyol, and a polycarbonate polyol are more preferred. Further, among them, from the viewpoint of obtaining better close adhesive force with a polycarbonate, a hydrogenated castor oil-based polyol, and a castor oil-based polyol are particularly preferred. In addition, the polyol compound may be used alone or in combination of two or more.

A castor oil-based polyol in the component (a-1) refers to including castor oil or a castor oil derivative in a broad sense. The castor oil is glycerin ester of an aliphatic acid having a ricinoleic acid as a main component. Among the castor oil-based polyols, castor oil is preferably used. In addition, the castor oil derivative may be for example, a transesterification reaction product of castor oil and polyhydric alcohol, partially dehydrated castor oil, partially acylated castor oil, an alkylene oxide adduct of castor oil, an epoxylated product of castor oil, a halogenated product of castor oil, castor oil fatty acid mono- or diester of a bisphenol alkylene oxide adduct, an esterified product of dimer acid and a castor oil-based polyol, a reaction product of transesterification reaction product of polymerized castor oil and caprolactone, a condensate of a dimer or higher of castor oil fatty acid or an ester of the condensate and polyhydric alcohol, or the like. However, the castor oil-based polyol may be the one other than those exemplified above. In addition, the castor oil-based polyol may be used alone or in combination or two or more.

In the component (a-1), the hydrogenated castor oil polyol has a structure in which an unsaturated double bond is changed to a saturated bond in the compound having a structure of the castor oil-based polyol. Here, a method changing an unsaturated double bond to a saturated bond is not particularly limited. When a hydrogenated castor oil-based polyol is used, long-term thermal resistance can be more improved than when the castor oil polyol is used. In addition, the hydrogenated castor oil-based polyol may be used alone or in combination of two or more.

Though not particularly limited thereto, the commercially available product of the castor oil-based polyol may be for example, URIC H-52, URIC H-56, or URIC H-57 manufactured by Itoh Oil Chemicals Co., Ltd.

In addition, though not particularly limited thereto, the commercially available product of the hydrogenated castor oil-based polyol may be for example, URIC PH-5001, PH-5002, PH-6000, URIC 1815U, or URIC 1886U manufactured by Itoh Oil Chemicals Co., Ltd., and HS-3G-500B manufactured by Hokoku Corporation.

The polycarbonate polyol in the component (a-1) is not particularly limited. The polycarbonate polyol may be for example, a reaction product obtained by one or more alkylenediols and one or more dialkyl carbonate or diaryl carbonate. Here, though not particularly limited thereto, the alkylenediol may be for example, 1,6-hexanediol, 1,5-pentanediol, 1,4-butanediol, 3-methyl-1,5-pentanediol, or the like. In addition, though not particularly limited thereto, the dialkyl carbonate may be for example, diethyl carbonate, trimethylene carbonate, tetramethylene carbonate, or the like. In addition, though not particularly limited thereto, the diaryl carbonate may be for example, diphenyl carbonate, or the like. In addition, the polycarbonate polyol may be used alone or in combination or two or more.

Though not particularly limited thereto, the commercially available product of the polycarbonate polyol may be for example, DURANOL (registered trademark) series (T6002, T6001, T5652, T5651, T5650J, T5650E, G4672, T4671, T4692, T4691, G3452, G3450J) manufactured by Asahi Kasei Corp., and ETERNACOLL (registered trademark) series (UH50, UH100, UH200, UH300, UHC50-200, UHC50-100, UC100, UM90) manufactured by Ube Industries, Ltd.

From the viewpoint that the viscosity of the curable resin composition to be obtained can be easily lowered, it is preferred that the polycarbonate polyol is liquid at room temperature (20 to 25° C.).

The polyisoprene polyol and the hydrogenated polyisoprene polyol in the component (a-1) are not particularly limited, however, from the viewpoint of excellent thermal resistance of the cured product, the polyisoprene polyol is preferred. This is because when the polyisoprene polyol is used, thermal resistance of the cured product is more improved than when the hydrogenated polyisoprene polyol is used, thereby obtaining a specific effect of having better thermal resistance of the cured product to be obtained.

The isoprene polyol in the component (a-1) is a polyisoprene compound having two or more hydroxyl groups in the molecule, and may have a functional group other than the hydroxyl group in the molecule. In addition, the isoprene polyol may be used alone or in combination of two or more. Though not particularly limited thereto, the commercially available product thereof may be for example, Poly ip manufactured by Idemitsu Kosan Co., Ltd., or the like.

The hydrogenated isoprene polyol in the component (a-1) is a hydrogenated polyisoprene compound having two or more hydroxyl groups in the molecule, in which an unsaturated bond of polyisoprene is hydrogenation treated, and may have a functional group other than the hydroxyl group in the molecule. In addition, the hydrogenated isoprene polyol may be used alone or in combination of two or more. Though not particularly limited thereto, the commercially available product thereof may be for example, EPOL manufactured by Idemitsu Kosan Co., Ltd., or the like.

The polyether polyol, the polyester polyol, and the polybutadiene polyol in the component (a-1) are not particularly limited, and known compounds can be used.

(Component (a-2))

The component (a-2) is not particularly limited as long as it is a polyisocyanate compound. The polyisocyanate compound may be a compound having two or more isocyanate groups in one molecule, and any one belonging to aromatic, linear aliphatic or cyclic aliphatic compounds can be used. Though not particularly limited thereto, the polyisocyanate compound may be for example, tolylene diisocyanate (TDI), diphenylmethane diisocyanate (MDI), 3,3'-dimethyl-4,4'-biphenylene diisocyanate, 1,4-phenylene diisocyanate, xylylene diisocyanate, tetramethylxylylene diisocyanate, naphthylene diisocyanate, dicyclohexylmethane-4,4'-diisocyanate, polymethylene.polyphenylisocyanate, isophorone diisocyanate, hexamethylene diisocyanate, hydrogenated xylene diisocyanate, the isomers thereof, isocyanurated products, carbodiimidized products, biureted products, and the like. Among them, tolylene diisocyanate (TDI) and diphenylmethane diisocyanate (MDI) are preferred. In addition, the polyisocyanate compound may be used alone or in combination of two or more.

<Component (B)>

The curable resin composition according to the first embodiment of the present invention includes a powder of a polyamine compound which is solid at 25° C. as a component (B).

The component (B) is not particularly limited as long as it is a powder of a polyamine compound which is solid at 25° C. More specifically, the polyamine compound may be for example, a compound having two or more primary amino groups or secondary amino groups in the molecule, or the like. In addition, a preferred specific example of the polyamine compound which can be used as the component (B) is not particularly limited, however, can include for example, one or more compounds selected from the group consisting of an aliphatic polyamine compound, an alicyclic polyamine compound, an aromatic polyamine compound, and a hydrazide compound, or the like. Among them, from the viewpoint of storage stability, it is preferred to use an aliphatic polyamine compound and a hydrazide compound, and from the viewpoint of a low change rate in rubber physical properties after a moisture resistance test, an aliphatic polyamine compound is particularly preferred. In addition, the polyamine compound may be used alone or in combination of two or more.

Though not particularly limited thereto, the aliphatic polyamine compound may be for example, 1,12-dodecanediamine, 1,10-decanediamine, 1,9-nonanediamine, 1,14-tetradecanediamine, 1,16-hexadecanediamine, or the like. Among them, 1,10-decanediamine is particularly preferred. In addition, the aliphatic polyamine compound may be used alone or in combination of two or more.

Though not particularly limited thereto, the alicyclic polyamine compound may be for example, menthenediamine, isophoronediamine, bis(4-amino-3-methylcyclohexyl) methane, a hydrogenated product of metaxylylene diamine, N-ethylaminopiperazine, or the like. In addition, the alicyclic polyamine compound may be used alone or in combination of two or more.

Though not particularly limited thereto, the aromatic polyamine compound may be for example, 4,4'-diaminodiphenylmethane, 2,4'-diaminodiphenylmethane, 3,3'-diaminodiphenylmethane, 3,4'-diaminodiphenylmethane, 2,2'-diaminobiphenyl, 2,4'-diaminobiphenyl, 3,3'-diaminobiphenyl, 2,4-diaminophenol, 2,5-diaminophenol, o-phenylenediamine, m-phenylenediamine, 2,3-tolylenediamine, 2,4-tolylenediamine, 2,5-tolylenediamine, 2,6-tolylenediamine, 3,4-tolylenediamine, or the like. In addition, the aromatic polyamine compound may be used alone or in combination of two or more.

Though not particularly limited thereto, the hydrazide compound may be for example, adipic dihydrazide, sebasic dihydrazide, isophthalic dihydrazide, 1,3-bis-(hydrazinocarboethyl)-5-isopropylhydantoin, eicosane diacid dihydrazide, hydroquinonedigylcolic dihydrazide, resorcinol diglycolic dihydrazide, 4,4'-ethylidenebisphenoldiglycolic dihydrazide, 7,11-octadecadiene-1,18-dicarbohydrizide, 3,3'-(4-isopropyl-2,5-dioxo-1,3-diazolidine-1,3-diyl)dipropionohydrazide, or the like. Among them, 1,3-bis-(hydrazinocarboethyl)-5-isopropylhydantoin is particularly preferred. In addition, the hydrazide compound may be used alone or in combination of two or more.

In addition, as the component (B), when an increase in the number of steps, an increase in processing costs, and the like are not considered, a polyamine compound in which the surface of particles constituting the powder is treated to be inactivated, that is, surface-inactivated polyamine compound powder may be used, if necessary. By using the polyamine compound powder treated to be inactivated, the curable resin composition has more improved storage stability.

An average particle diameter of the component (B) is not particularly limited, however, preferably 0.01 to 100 μm, more preferably 0.1 to 100 μm, more preferably 0.1 to 50 μm, still more preferably 0.5 to 20 μm, particularly preferably 1 to 10 μm, and most preferably 2 to 5 μm. With the average particle diameter of 100 μm or less, curability at low temperature is better, and with the average particle diameter of 0.01 μm or more, storage stability is better. In addition, a ratio of a maximum particle diameter to an average particle diameter (maximum particle diameter/average particle diameter) is not particularly limited, however, for example, is preferably 10 or less, more preferably 5 or less, and more preferably 3.5 or less. When the ratio of the maximum particle diameter to the average particle diameter is 10 or less, uniformity and stability of the curable composition is improved. In addition, though the lower limit value of the ratio of the maximum particle diameter to the average particle diameter (maximum particle diameter/average particle diameter) is usually 1 or more, the lower limit value is preferably more than 1 from the viewpoint of productivity, and more preferably 2 or more. In addition, as a method of confirming the average particle diameter, a particle size/shape distribution measuring instrument in the manner of laser diffraction scattering or microsorting control, image analysis such as an optical microscope and an electronic microscope can be mentioned.

Though a melting point of the component (B) is not particularly limited thereto, the melting point is preferably 40° C. or more, more preferably 45° C. or more, more preferably 50° C. or more, and particularly preferably 60° C. or more. When the melting point is 40° C. or more, the curable resin composition has better storage stability. In addition, though the lower limit of the melting point of the component (B) is not particularly limited thereto, the lower limit is preferably 250° C. or less, more preferably 200° C. or less, more preferably 150° C. or less, and particularly preferably 120° C. or less. When the melting point is 250° C. or less, the curable resin composition has better curability at low temperature. In addition, the melting point is a value obtained by a DSC measurement method.

In addition, a method of preparing the particles constituting the powder is not particularly limited, and optional chemical method and mechanical grinding method can be used. As the grinding method, a method of using a crushing granulating sizer, a jet mill, a planetary ball mill, a hammer mill, or the like can be used. Here, as the grinding method, it is preferred that coarse grinding is performed, and then fine grinding is performed again. In addition, when the compound has a low melting point, freeze grinding is effective.

A combination ratio of the component (A) and the component (B) is not particularly limited, and these components can be used at an optional ratio according to the purpose. Here, the combination ratio of the component (B) is such that the component (B) is preferably 0.1 to 100 parts by mass, more preferably 0.5 to 50 parts by mass, still more preferably 1 to 20 parts by mass, and particularly preferably 5 to 15 parts by mass, based on 100 parts by mass of the component (A). Within the range, the storage stability of the curable resin composition and the close adhesion of the cured product to a polycarbonate are more improved, whereby the storage stability of the curable resin composition to be obtained and the close adhesion of the cured product to a polycarbonate are better.

In addition, a ratio of the isocyanate group of the component (A) and the amino group of the component (B) is not particularly limited, and the components can be used at an optional ratio according to the purpose. Here, the ratio of the amino group of the component (B) is such that an equivalent of the amino group of the component (B) is in a range of 0.4 to 3.0, and particularly preferably in a range of 0.7 to 2.0, based on one equivalent of the isocyanate group of the component (A). Within the range, storage stability and the close adhesion of the cured product to a polycarbonate are more improved, whereby the storage stability of the curable resin composition to be obtained and the close adhesion of the cured product to a polycarbonate are better.

<Component (C)>

The curable resin composition according to the first embodiment of the present invention includes at least one selected from the group consisting of a monofunctional (meth)acrylate compound having an alicyclic structure, a monofunctional (meth)acrylate compound having an aromatic ring, a monofunctional (meth)acrylate compound having a hydrolyzable silyl group, and a polyfunctional (meth)acrylate compound, as a component (C).

The component (C) is not particularly limited as long as it is a compound selected from the group consisting of a monofunctional (meth)acrylate compound having an alicyclic structure, a monofunctional (meth)acrylate compound having an aromatic ring, a monofunctional (meth)acrylate compound having a hydrolyzable silyl group, and a polyfunctional (meth)acrylate compound. The component (C) is used in combination with the component (A) and the component (B), thereby exhibiting a remarkable effect of significantly improving storage stability and close adhesion of the cured product to a polycarbonate to obtain a curable resin composition having extremely good properties.

In addition, in the present specification, a (meth)acrylate compound refers to a compound having one or more (meth)acryloyloxy groups ((meth)acryloxy groups) in the molecule. Here, the monofunctional (meth)acrylate compound refers to a compound having one (meth)acryloyloxy group in the molecule, and the polyfunctional (meth)acrylate compound refers to a compound having two or more (meth)acryloyloxy groups in the molecule. In addition, the (meth)acrylate refers to acrylate or methacrylate, and the (meth)acryloyloxy group ((meth)acryloxy group) refers to an acryloyloxy group (acryloxy group) or a methacryloyloxy group (methacryloxy group).

In addition, the component (C) is, from the viewpoint of better storage stability, for a (meth)acrylate compound having a alicyclic structure, a (meth)acrylate compound having an aromatic ring, and a (meth)acrylate compound having a hydrolysable silyl group, more preferably a mono(meth)acrylate compound (monofunctional (meth)acrylate compound).

Though not particularly limited thereto, the monofunctional (meth)acrylate compound having an alicyclic structure may be preferably a (meth)acrylate monomer having an alicyclic group having 5 to 30 carbon atoms. Though not particularly limited thereto, the (meth)acrylate monomer having an alicyclic group having 5 to 30 carbon atoms may be for example, cyclohexyl (meth)acrylate, dicyclopentanyl (meth)acrylate, dicyclopentenyl (meth)acrylate, dicyclopentenyloxy (meth)acrylate, isobornyl (meth)acrylate, adamantyl (meth)acrylate, dicyclopentenyl di(meth)acrylate, or the like. Among them, isobornyl (meth)acrylate is preferred, and isobornyl acrylate is more preferred. The monofunctional (meth)acrylate compound having an alicyclic structure may be used alone or in combination of two or more.

As the commercially available product of the monofunctional (meth)acrylate compound having an alicyclic structure, FA-512M, FA-512MT, and FA-513M (manufactured by Hitachi Chemical Company, Ltd.), DCP (manufactured by Shin Nakamura Chemical Co., Ltd.), CHMA (manufactured by BASF), BX-ADMA and BX-DCPMA (manufactured by Bimax Chemicals Ltd.), LIGHT ACRYLATE (registered trademark) IB-XA, LIGHT ESTER IB-X (manufactured by Kyoeisha Chemical Co., Ltd.), CHMA (manufactured by MITSUBISHI RAYON CO., LTD.), SR423 (manufactured by Sartomer), and the like can be mentioned. These may be used alone or in combination of two or more.

Though not particularly limited thereto, the monofunctional (meth)acrylate compound having an aromatic ring may be for example, phenoxyethyl (meth)acrylate, benzyl (meth)acrylate, phenyl (meth)acrylate, phenoxydiethyleneglycol (meth)acrylate, phenoxytetraethyleneglycol (meth)acrylate, nonylphenoxyethyl (meth)acrylate, or the like. Among them, phenoxyethyl (meth)acrylate is preferred, and phenoxyethylacrylate is more preferred. The monofunctional (meth)acrylate compound having an aromatic ring may be used alone or in combination of two or more.

Though not particularly limited thereto, the commercially available product of the monofunctional (meth)acrylate compound having an aromatic ring may be for example, LIGHT ESTER BZ, LIGHT ACRYLATE (registered trademark) PO-A, and LIGHT ESTER PO (manufactured by Kyoeisha Chemical Co., Ltd.), FA-318AS and FA-314A (manufactured by Hitachi Chemical Company, Ltd.), or the like. These may be used alone or in combination of two or more.

Though not particularly limited thereto, the monofunctional (meth)acrylate compound having a hydrolyzable silyl group may be for example, 3-(meth)acryloxypropyltrimethoxysilane, 3-(meth)acryloxypropyltriethoxysilane, 3-(meth)acryloxypropylmethyldimethoxysilane, 3-(meth)acryloxypropylmethyldiethoxysilane, or the like. Among them, 3-(meth)acryloxypropyltrimethoxysilane is preferred, and 3-methacryloxypropyltrimethoxysilane is more preferred. The monofunctional (meth)acrylate compound having a hydrolyzable silyl group may be used alone or in combination of two or more.

Though not particularly limited thereto, the commercially available product of the monofunctional (meth)acrylate compound having a hydrolyzable silyl group may be for example, KBM-502, KBM-503, KBE-502, KBE-503, and KBM-5103 (manufactured by Shin-Etsu Chemical Co., Ltd.), or the like. These may be used alone or in combination of two or more.

Though not particularly limited thereto, the polyfunctional (meth)acrylate compound may be for example, difunctional (meth)acrylates such as ethyleneglycol di(meth)acrylate, 1,4-butanediol di(meth)acrylate, 1,6-hexanediol di(meth)acrylate, 1,9-nonanediol di(meth)acrylate, 1,10-decanediol di(meth)acrylate, diethyleneglycol di(meth)acrylate, triethyleneglycol di(meth)acrylate, polyethyleneglycol di(meth)acrylate, dipropyleneglycol di(meth)acrylate, tripropyleneglycol di(meth)acrylate, polypropyleneglycol di(meth)acrylate, neopentylglycoldi(meth)acrylate, polytetramethyleneglycol di(meth)acrylate, neopentylglycoladipatedi(meth)acrylate, hydroxypivalic acid neopentylglycol di(meth)acrylate, dicyclopentanyldi(meth)acrylate, dimethyloltricyclodecane di(meth)acrylate, caprolactone modified dicyclopentenyl di(meth)acrylate, ethyleneoxide modified phosphoric acid di(meth)acrylate, isocyanurate di(meth)acrylate, allylated cyclohexyldi(meth)acrylate, and isocyanuric acid EO modified di(meth)acrylate; trifunctional (meth)acrylates such as pentaerythritol tri(meth)acrylate, dipentaerythritol tri(meth)acrylate, propionic acid modified dipentaerythritol tri(meth)acrylate, trimethylolpropane tri (meth)acrylate, ethyleneoxide modified trimethylolpropane tri(meth)acrylate, propyleneoxide modified trimethylolpropane tri(meth)acrylate, tris(acryloxyethyl)isocyanurate, and isocyanuric acid EO modified tri(meth)acrylate; tetrafunctional (meth)acrylates such as pentaerythritoltetra(meth)acrylate, ditrimethylolpropanetetra(meth)acrylate; penta- or higher functional (meth)acrylates such as dipentaerythritolpenta(meth)acrylate, propionic acid modified dipentaerythritolpenta(meth)acrylate, dipentaerythritolhexa(meth)acrylate, caprolactone modified dipentaerythritolhexa(meth)acrylate, dipentaerythritolpenta(meth)acrylate, propionic acid modified dipentaerythritolpenta(meth)acrylate, dipentaerythritolhexa(meth)acrylate, and caprolactone modified dipentaerythritolhexa(meth)acrylate, or the like. Among them, difunctional (meth)acrylate, trifunctional (meth)acrylate, and tetrafunctional (meth)acrylate are preferred, difunctional (meth)acrylate and trifunctional (meth)acrylate are more preferred, and isocyanuric acid EO modified di(meth)acrylate, trimethylolpropane tri(meth)acrylate, isocyanuric acid EO modified tri(meth)acrylate are more preferred, and isocyanuric acid EO modified diacrylate, trimethylolpropane tri(meth)acrylate, and isocyanuric acid EO modified triacrylate are particularly preferred.

Though not particularly limited thereto, the commercially available product of the polyfunctional (meth)acrylate compound may be for example, NK Ester (registered trademark) series A-200, A-400, A-600, A-1000, A-DCP, A-DOD-N, A-HD-N, A-NOD-N, APG-100, APG-200, APG-400, APG-700, A-PTMG-65, A-TMM-3, A-TMM-3L, A-TMM-3LM-N, A-TMPT, AD-TMP, A-TMMT, 1G, 2G, 3G, 4G, 9G, 14G, 23G, DCP, DOD-N, HD-N, NOD-N, NPG, 9PG, and TMPT (manufactured by Shin Nakamura Chemical Co., Ltd.), ARONIX (registered trademark) series M-215, M-220, M-225, M-270, M-240, M-309, M-310, M-321, M-350, M-360, M-313, M-315, M-306, M-305, M-450, M-408, M-403, M-400, M-402, M-404, M-406, and M-405 (manufactured by TOAGOSEI CO., LTD.), DPGDA, HDDA, TPGDA, IRR214-K, PEG400DA-D, HPNDA, PETIA, PETRA, TMPTA, PETA, DPHA, EBECRYL (registered trademark) series 130, 11, 140, and 1142 (manufactured by DAICEL-ALLNEX LTD.), or the like. These may be used alone or in combination of two or more.

A combining amount of the component (C) is 3 to 50 parts by mass, more preferably 6 to 45 parts by mass, more preferably 7 to 40 parts by mass, still more preferably 9 to 40 parts by mass, particularly preferably 15 to 35 parts by mass, and most preferably 20 to 30 parts by mass, based on 100 parts by mass of the component (A). When the component (C) is included at 3 parts by mass or more, the close adhesion of the cured product to a polycarbonate is excellent, and when the component (C) is included at 50 parts by mass or less, storage stability is excellent.

<Photoradical Initiator>

The curable resin composition according to the first embodiment of the present invention does not substantially include a photoradical initiator.

When the photoradical initiator is included, if an active energy ray such as an ultraviolet ray exists during storage of the curable resin composition, polymerization of the component (B) proceeds to lead to insufficient preservation. Here, the photoradical initiator refers to a compound which generates radicals by irradiation of an active energy ray such as visible light and an ultraviolet ray or irradiation of an active beam or a radiation, and initiates/promotes reaction of a radical polymerizable group by the radicals.

A representative example of the photoradical initiator may include acetophenones, benzoines, benzophenones, ketals, anthraquinones, thioxanthones, azo compounds, peroxides, 2,3-dialkyldione compounds, disulfide compounds, thiuram compounds, fluoroamine compounds, oxime esters, or the like. However, the curable resin composition according to the present invention does not substantially include any photoradical initiator as well as the above-listed representative examples.

In addition, in the present specification, 'substantially not including' refers to a content of the photoradical initiator being less than 1% by mass based on the total mass of the curable resin composition. Here, the content of the photoradical initiator is preferably 0.1% by mass or less, which is a smaller amount, more preferably 0.01% by mass or less, and particularly preferably 0% by mass, which means that the composition does not include the photoradical initiator at all, based on the total mass of the curable resin composition. Accordingly, in the curable resin composition according to one particularly preferred embodiment of the present invention, it is excluded to include the photoradical initiator.

<Component (D)>

It is preferred that the curable resin composition according to the first embodiment of the present invention further includes a compound having a glycidyl group as a component (D). The component (D) has a function of improving storage stability and close adhesion of the cured product after moisture resistance to a polycarbonate.

Here, the compound having a glycidyl group in the component (D) may be for example, a compound containing an epoxy group on an alicyclic ring in the molecule, such as 3-4-epoxycyclohexyl.

Though not particularly limited thereto, the component (D) may be for example, epi-bis type liquid epoxy resins such as diglycidylether derived from bisphenol A and epichlorohydrin and derivatives thereof and diglycidylether derived from bisphenol F and epichlorohydrin and derivatives thereof; aliphatic cyclic epoxy resins such as glycidylether derived from aliphatic/aromatic alcohol and epichlorohydrin, glycidyl ester derived from polybasic acid and epichlorohydrin and derivatives thereof, glycidylether derived from hydrogenated bisphenol A and epichlorohydrin, 3,4-epoxy-6-methylcyclohexylmethyl-3,4-epoxy-6-methylcyclohexanecarboxylate, vinylcyclohexene oxide, and bis(3,4-epoxy-6-methylcyclohexylmethyl) adipate, and derivatives thereof; 5,5'-dimethylhydantoin type epoxy resins, triglycidylisocyanate, a substitution type epoxy derived from isobutylene, compounds containing an alkoxysilyl group in the molecule such as glycidoxypropyltrimethoxysilane, and the like. Among them, epi-bis type liquid epoxy resins, glycidylether derived from aliphatic/aromatic alcohol and epichlorohydrin, and compounds containing an alkoxysilyl group in the molecule are preferred, a compound having an alkoxysilyl group in the molecule is more preferred, 2-(3,4-epoxycyclohexyl)ethyltrimethoxysilane, 3-glycidoxypropylmethyldimethoxysilane, 3-glycidoxypropyltrimethoxysilane, 3-glycidoxypropylmethyldiethoxysilane, 3-glycidoxypropyltriethoxysilane are more preferred, and 3-glycidoxypropyltrimethoxysilane is particularly preferred. These may be used alone or in combination of two or more.

Though not particularly limited thereto, the commercially available product of the component (D) may be for example, jER (registered trademark) series 828, 1001, 801, 806, 807, 152, 604, 630, 871, YX8000, YX8034, YX4000 (manufactured by Mitsubishi Chemical Corporation), CARDURA (registered trademark) series E10P, YL7000, YL7007 (manufactured by Japan Epoxy Resins Co. Ltd.), EPICLON (registered trademark) series 830, 835LV, HP4032D, 703, 720, 726, HP820 (manufactured by Dainippon Ink and Chemicals, Incorporated), EP4100, EP4000, EP4080, EP4085, EP4088, EPU6, EPR4023, EPR1309, EP49-20 (manufactured by Asahi Denka Co., Ltd.), Denacol (registered trademark) series EX411, EX314, EX201, EX212, EX252, EX111, EX146, EX721, Denalex (registered trademark) series FCA-061L, FCA-061M (manufactured by Nagase ChemteX Corporation), KBM-303, KBM-403, KBE-403, KBM-402, KBE-402 (manufactured by Shin-Etsu Chemical Co., Ltd.), or the like. These may be used alone or in combination of two or more.

A combining amount of the component (D) is preferably 0.1 to 10 parts by mass, more preferably 0.5 to 5 parts by mass, still more preferably 1 to 4 parts by mass, and particularly preferably 1.5 to 3 parts by mass, based on 100 parts by mass of the component (A). When the component (D) is included at 0.1 parts by mass or more, storage stability and close adhesion of the cured product after moisture resistance to a polycarbonate is more excellent, and when the component (D) is included at 10 parts by mass or less, storage stability of the curable resin composition is better.

<Optional Components>

The curable resin composition according to the first embodiment of the present invention may be further combined with appropriate amounts of various additives such as an isocyanate compound having one or more isocyanate groups in one molecule (excluding the component (A)); a thiirane resin; a coupling agent; moisture polymerization catalysts such as an organic tin-based catalyst, a bismuth-based catalyst, a titanium-based catalyst; epoxy latent catalysts such as dicyanamide, an amine-epoxy adduct, an urea type adduct, and solid imidazole; preservation improvers such as phosphoric acid ester and boric acid ester; coloring agents such as a pigment and a dye; inorganic fillers such as calcium carbonate, talc, silica, alumina, aluminum hydroxide, magnesium hydroxide, and carbon, and inorganic fillers of which the surface is treated with an organic acid or a coupling agent; a flame retardant; organic filler such as acrylic rubber or silicone rubber; a plasticizer; a reactant plasticizer containing a reactant functional group such as an acryl group in the molecule; an antioxidant; an ultraviolet ray absorber; a deformer; a dehydrating agent; a levelling agent; a rheology controlling agent, according to the purpose, to the extent that the features of the present invention are not impaired. By adding the additives, the curable resin composition and the cured product thereof having better characteristics to be desired such as flexibility, resin strength, adhesive strength, flame retardancy, thermal conductivity, and workability are obtained.

Though not particularly limited thereto, the compound having one or more isocyanate groups in one molecule may be for example, phenylisocyanate, p-toluenesulfonylisocyanate, 3-isoprophenyl-α,α'-dimethylbenzylisocyanate, 3-isocyanatepropyltriethoxysilane, or the like, in addition to the polyisocyanate compound which is the component (a-2). Here, the polyisocyanate compound which is the component (a-2) is treated not as a partial structure of the component (A) but as an optional component in the curable resin composition, when the polyisocyanate compound is present independently. These compounds may be used alone or in combination of two or more. By adding the compound having one or more isocyanate groups in one molecule, the curable resin composition according to one embodiment of the present invention has an effect of more easily adjusting viscosity and having more improved adhesion. A combining ratio (added amount) of the compound having one or more isocyanate groups in one molecule is not particularly limited, however, is preferably in a range of 0.1 to 20 parts by mass, based on 100 parts by mass of the component (A).

Though not particularly limited thereto, the thiirane resin may be for example, 2,2-bis(4-(2,3-epithiopropoxy)phenyl) propane, bis(4-(2,3-epithiopropoxy)phenyl)methane, 1,6-di (2,3-epithiopropoxy) naphthalene, 1,1,1-tris-(4-(2,3-epithiopropoxy)phenyl)ethane, 2,2-bis(4-(2,3-epithiopropoxy) cyclohexyl)propane, bis(4-(2,3-epithiopropoxy)cyclohexyl) methane, 1,1,1-tris-(4-(2,3-epithiopropoxy)cyclohexyl) ethane, (2,3-epithiocyclohexyl)ether of 1,5-pentanediol, di(3,4-epithiooctyl) ether of 1,6-hexanediol, or the like. By adding the thiirane resin, the curable resin composition according to one embodiment of the present invention can have further reduced viscosity or further improvement of properties such as adhesive force and durability. A combining ratio (added amount) of the thiirane resin is not particularly limited and the thiirane resin can be added at an optional ratio according to the purpose, however, it is preferred that the thiirane resin is included in a range of 0.1 to 100 parts by weight, based on 100 parts by mass of the component (A). Within the range, reduction of viscosity or further improvement of adhesive force and durability can be achieved without impairing flexibility which is the characteristic of the cured product.

A second embodiment of the present invention relates to a method of preparing (producing) the curable resin composition according to the first embodiment of the present invention.

In the preparation of the curable resin composition according to one embodiment of the present invention, an order of mixing constituent components is not particularly limited, however, it is preferred to mix the component (A) and the component (B) first, and then further mix other components such as the component (C) or the optional components, from the viewpoint of increasing preservation of the curable resin composition. In addition, a stirring condition, types of agitator, and the like during mixing are not particularly limited, and can be appropriately set depending on the kind of each component. Here, a preferred stirring time can be for example, 5 to 180 minutes, and a preferred stirring temperature can be, for example, room temperature (20 to 25° C.). In addition, when other components such as the component (C) or the optional components are further mixed, though not particularly limited thereto, it is preferred to perform mixing by stirring while defoaming under vacuum.

<Curing Method>

A third embodiment of the present invention relates to a method of curing the curable resin composition according to the first embodiment of the present invention.

The curable resin composition according to one embodiment of the present invention can be rapidly cured by heating. In addition, the curable resin composition according to one embodiment of the present invention can be cured by moisture in the air without heating. This means that even an insufficiently cured portion due to non-uniform heating can be cured by moisture when subsequently allowed to stand in a room. Further, the curable resin composition according to one embodiment of the present invention can be used as an adhesive, resulting in an increase in reliability of the adhesive. In addition, as a curing condition by heating, a heating temperature is not particularly limited, however, preferably 50 to 200° C., and more preferably 70 to 150° C. In addition, a heating time is not particularly limited, however, preferably 5 to 180 minutes, and more preferably 10 to 90 minutes. In addition, a condition of being allowed to stand in a room is not particularly limited, however, may be for example, at room temperature under ordinary humidity ((20 to 25° C./relative humidity of 40 to 50% RH). In addition, a standing time is preferably 10 to 360 minutes, and more preferably 20 to 180 minutes.

<Cured Product>

A fourth embodiment of the present invention relates to a cured product of the curable resin composition according to the first embodiment of the present invention.

The cured product according to one embodiment of the present invention has high close adhesion to a polycarbonate.

Regarding to the cured product according to one embodiment of the present invention, a method of curing the curable resin composition according to one embodiment of the present invention is not particularly limited as long as the cured product is obtained by curing the curable resin composition according to one embodiment of the present invention, and a manner in which the composition is cured does not matter. The cured product according to one embodiment of the present invention can be obtained for example, by curing the curable resin composition according to one embodiment of the present invention by heating according to the curing method as described above.

From the above, a fifth embodiment of the present invention relates to a method of producing a cured product including the curing method according to the third embodiment of the present invention.

<Bonded Body>

A sixth embodiment of the present invention relates to a bonded body formed by adhering an adherend using the curable resin composition according to the first embodiment of the present invention. That is, the sixth embodiment of the present invention relates to a bonded body including the cured product according to the fourth embodiment of the present invention and adherends, and more specifically, a first adherend, the cured product according to the fourth embodiment of the present invention, and a second adherend are laminated in this order, and at the same time, surfaces of the first adherend and the second adherend and surfaces of the cured product are adhered to each other.

In the bonded body according to one embodiment of the present invention, the cured product can be an adhesive layer of two adherends. The bonded body according to one embodiment of the present invention is not particularly limited as long as the bonded body is formed by adhering the adherend using the curable resin composition according to one embodiment of the present invention. Though not particularly limited thereto, the adherend may be for example, metals such as iron, copper, zinc, aluminum, and magnesium, plastics such as polycarbonate, polyacrylate, polyphenyleneether, polybutyleneterephthalate, polyethylene, polyamide, polyimide, polyphenylenesulfide, polyetheretherketone, a fluorine polymer, and a liquid crystal polymer, ceramics such as glass and silica, or the like. Since the cured product to be obtained from the curable resin composition according to one embodiment of the present invention exhibits particularly excellent close adhesion to plastics, in particular polycarbonates, among the adherends, the polycarbonate is particularly preferred.

For the bonded body, it is preferred that the cured product after moisture resistance has better close adhesion to a polycarbonate. From this, in the bonded body according to one embodiment of the present invention, when the first adherend and the second adherend are a polycarbonate, the strength of the bonded body after a moisture resistance test after 96 hours at 60° C. under relative humidity of 95% RH is not particularly limited, however, a strength of 1.0 MPa or more is particularly preferred. The strength of the bonded body can be measured using a tensile tester. Details of a method of measuring the strength of the bonded body after a moisture resistance test will be described in the Example.

In addition, a seventh embodiment of the present invention relates to a method of producing a bonded body formed by adhering an adherend (for example, a first adherend and a second adherend) using the curable resin composition according to the first embodiment of the present invention.

<Use>

The curable resin composition according to one embodiment of the present invention is not limited to a specific use, and can be used for various uses. Among them, since the curable resin composition according to one embodiment of the present invention can rapidly produce a cured product having excellent durability and flexibility by heating, and has excellent adhesive force to plastics, iron, or the like, the uses such as adhesion, sealing, casting, painting, coating materials, molding of optical components, and the like are preferred. In particular, the curable resin composition has excellent storage stability and close adhesion of the cured product to a polycarbonate, the use as an adhesive is preferred.

As more specific uses of the curable resin composition according to one embodiment of the present invention, in the field of automobiles and transports, the uses of adhesion, sealing, casting, molding, coating materials, or the like for switch components for automobiles, a head lamp, components in engines, electrical components, a driving engine, a brake oil tank, or the like can be mentioned. In a flat panel display, the uses of adhesion, sealing, casting, molding, coating materials, or the like of a liquid crystal display, an organic electroluminescence, a light emitting diode display, and a field emission display can be mentioned. In the field of electronic mobile devices such as mobile phones and multifunctional mobile phones, the uses of adhesion, sealing, casting, molding, coating materials, or the like of various elements can be mentioned. In the field of recording, the uses of adhesion, sealing, casting, molding, coating materials, or the like of a video disc, CD, DVD, MD, a pickup lens, hard disk surroundings (members for a spindle motor, members of a magnetic head actuator, or the like), a Blu-ray disc, or the like can be mentioned. In the field of electronic materials, the uses of sealing materials of electronic components, an electric circuit, an electrical contact, a semiconductor element, or the like, a die bonding agent, a conductive adhesive, an anisotropic conductive adhesive, an interlayer adhesive of a multilayer substrate including a build-up substrate, a solder resist, or the like can be mentioned. In the field of batteries, the uses of adhesion, sealing, casting, molding, coating materials, or the like of a Li battery, a manganese battery, an alkaline battery, a nickel-based battery, a fuel battery, a silicone-based solar cell, a dye-sensitized solar cell, an organic solar cell, or the like can be mentioned. In the field of optical components, the uses of adhesion, sealing, casting, molding, coating materials, or the like of optical switch surroundings in an optical communication system, optical fiber materials in optical connector surroundings, optical passive components, optical circuit components, optical electronic integrated circuit surrounds, or the like can be mentioned. In the field of optical equipment, the uses of adhesion, sealing, casting, molding, coating materials, or the like of materials for lens of a steel camera, a finder prism, a target prism, a finder cover, a light receiving sensor part, an imaging lens, a projection lens of a projection television, or the like can be mentioned. As other uses, a use of assembling of motors and relays, or the like is also preferred.

EXAMPLES

Next, the present invention will be described in more detail by the Examples and the Comparative Examples. However, the technical scope of the present invention is not limited only to the following Examples.

Synthesis of Urethane Prepolymer 1

To a planetary agitator having a volume of 3 L equipped with a heating temperature controller, 800.0 g of a hydrogenated castor oil-based polyol (URIC 1815U, manufactured by Itoh Oil Chemicals Co., Ltd., the average number of hydroxyl groups per one molecule: 2) as the component (a-1) and 161.0 g of diphenylmethane-4,4'-diisocyanate (COSMONATE (registered trademark) PH, manufactured by Mitsui Chemical Polyurethane, Inc.) as the component (a-2) were added. Next, the mixture was stirred to be reacted under a nitrogen atmosphere at 40° C. for 1 hour and at 60° C. for 5 hours, thereby obtaining urethane prepolymer 1 having a viscosity of 142 Pa·s (25° C.) as the component (A).

Synthesis of Urethane Prepolymer 2

To a planetary agitator having a volume of 3 L equipped with a heating temperature controller, 600.0 g of a castor oil-based polyol (URIC H-56, manufactured by Itoh Oil Chemicals Co., Ltd., the average number of hydroxyl groups per one molecule: 2) as the component (a-1) and 148.0 g of tolylenediisocyanate (COSMONATE (registered trademark) T100, manufactured by Mitsui Chemical Polyurethane, Inc.) as the component (a-2) were added. Next, the mixture was stirred to be reacted under a nitrogen atmosphere at 40° C. for 1 hour and at 60° C. for 5 hours, thereby obtaining urethane prepolymer 2 having a viscosity of 7.3 Pa·s (25° C.).

Synthesis of Urethane Prepolymer 3

To a planetary agitator having a volume of 3 L equipped with a heating temperature controller, 400 parts by mass of a polycarbonate polyol of which a number average molecular weight is 2000 (DURANOL (registered trademark) T5652, manufactured by Asahi Kasei Corp., the average number of hydroxyl groups per one molecule: 2) as the component (a-1) and 69.6 parts by mass of tolylene diisocyanate (CORONATE (registered trademark) T-80, manufactured by Nippon Polyurethane Industry Co., Ltd.) as the component (a-2) were added. Next, the mixture was stirred to be reacted at 60° C. for 8 hours, thereby obtaining urethane prepolymer 3 having a viscosity of 1350 Pa·s (25° C.) as the component (A).

Production of Polyamine Powder 1

1,10-decanediamine (melting point: 62° C.) in the state of crystal mass was coarsely ground with a crushing granulating sizer, and ground with a jet mill, thereby obtaining polyamine powder 1 which is amine powder having an average particle diameter of 5 μm and a maximum particle diameter of 17 μm. Here, for measurement of the particle diameter, a laser diffraction/scattering particle size distribution measuring instrument (LMS-30, manufactured by SEISHIN ENTERPRISE Co., Ltd) was used.

Examples 1 to 12 and Comparative Examples 1 to 5

For preparing each curable resin composition of Examples 1 to 12 and Comparative Examples 1 to 5, the following components were prepared:

<Component (A)>
a1: urethane prepolymer 1,
a2: urethane prepolymer 2,
a3: urethane prepolymer 3.
<Component (B)>
b1: polyamine powder 1,
b2: 1,3-bis(hydrazinocarbonoethyl)-5-isopropylhydantoin (Ajicure (registered trademark) VDH-J, manufactured by Ajinomoto Fine-Chemical Co., Inc.) having an average particle diameter of 2 µm and a melting point of 120° C.
<Component (C)>
c1: phenoxyethylacrylate (LIGHT ACRYLATE (registered trademark) PO-A, manufactured by Kyoeisha Chemical Co., Ltd.),
c2: phenoxyethylmethacrylate (LIGHT ESTER PO, manufactured by Kyoeisha Chemical Co., Ltd.),
c3: isobornylacrylate (LIGHT ACRYLATE (registered trademark) IB-XA, manufactured by Kyoeisha Chemical Co., Ltd.),
c4: isobornylmethacrylate (LIGHT ESTER IB-X, manufactured by Kyoeisha Chemical Co., Ltd.),
c5: 3-methacryloxypropyltrimethoxysilane (KBM-503, manufactured by Shin-Etsu Chemical Co., Ltd.),
c6: trimethylolpropanetrimethacrylate (NK Ester (registered trademark) TMPT, manufactured by Shin Nakamura Chemical Co., Ltd.),
c7: trimethylolpropanetriacrylate (NK ESter (registered trademark) A-TMPT, manufactured by Shin Nakamura Chemical Co., Ltd.),
c8: a mixture of isocyanuric acid EO modified diacrylate and isocyanuric acid EO modified triacrylate (ARONIX (registered trademark) M-313, manufactured by TOAGOSEI CO., LTD.),
c9: dipentaerythritolhexaacrylate (DPHA, manufactured by Dicel Allnex Ltd.).
<Comparative Component of Component (C)>
c'1: isonornylacrylate (INAA, manufactured by OSAKA ORGANIC CHEMICAL INDUSTRY, Ltd.),
c'2: 2-hydroxyethylacrylate (LIGHT ACRYLATE (registered trademark) HOA, manufactured by Kyoeisha Chemical Co., Ltd.),
c'3: 2-hydroxypropylacrylate (LIGHT ACRYLATE (registered trademark) HOP-A, manufactured by Kyoeisha Chemical Co., Ltd.),
c'4: 2-isocyanatoethylmethacrylate (Karenz MOI (registered trademark), manufactured by Showa Denko K.K.).

A method of producing each curable resin composition of Examples 1 to 12 and Comparative Examples 1 to 5 is as follows. First, the component (A) and the component (B) were weighed and stirred by an agitator for 30 minutes. Next, other components (the component (C) or the comparative component of the component (C) in the present preparation) were weighed, and further added to the agitator, and then the mixture was further stirred for 30 minutes while defoamed under vacuum to produce a curable resin composition. Here, the detailed preparation amount of each component followed the following Tables 1 to 3. In addition, the values in the following Tables 1 to 3 are all expressed as parts by mass.

For each curable resin composition of Examples 1 to 12 and Comparative Examples 1 to 5, the following test was performed.

<Confirmation Test of Storage Stability>

To a glass vial having a volume of 20 ml, each curable resin composition was added and allowed to stand in a room set at 25° C. for 7 days with the lid closed. Thereafter, each curable resin composition was brought into contact with a rod having a sharp tip to confirm flowability, and evaluation was performed based on the following criteria. The results are shown in the following Tables 1 to 3.

[Evaluation Criteria]
∘ (good): flowability being confirmable,
x (poor): not flowable due to gelation.

<Close Adhesion Test of Cured Product to Polycarbonate (PC)>

Two sheets of polycarbonate specimens having a thickness of 5 mm×a width of 25 mm×a length of 50 mm were bonded to each other with each curable resin composition so that the specimens were crossed to each other. Next, each laminate in which the polycarbonate specimen (first adherend), the curable resin composition, and the polycarbonate specimen (second adherend) were laminated in this order was heated at 80° C. for 30 minutes, with each fixed with a jig, and thereafter, was allowed to stand at room temperature for 1 hour to manufacture each test piece. Here, each test piece had a structure in which the surfaces of the first adherend and the second adherend and the surfaces of the cured product were adhered to each other, and the cured product became an adhesive layer adhering two adherends. Then, each test piece was pressed by a cross head using a tensile tester until the two polycarbonate specimens (adherends) were separated. Thereafter, the state of the adhesive layer (cured product) on each adherend was observed to perform evaluation based on the following criteria. The results are shown in the following Tables 1 to 3. In addition, in the present test, when the adhesive layer had higher close adhesive force, cohesive failure was caused, and when the adhesive layer had lower close adhesive force, interfacial fracture was caused. As an evaluation result, ∘ or ⊚ is preferred from the viewpoint of practicality. In addition, 'unmeasurable' means that evaluation was impossible since the composition was not cured. In addition, as an evaluation using the curable resin composition according to Comparative Examples 3 and 4, the storage stability of the curable resin composition was significantly deteriorated so that the present test was not able to be performed, and thus, 'not measured' is indicated in the section of evaluation results.

[Evaluation Criteria]
⊚ (excellent): the adhesive layer was in a cohesive failure state as a whole,
∘ (good): the adhesive layer had a portion of cohesive failure and a portion of interfacial fracture,
x (poor): the adhesive layer was in an interfacial fracture state as a whole.

TABLE 1

| Component | | Example 1 | Example 2 | Example 3 | Example 4 | Example 5 | Example 6 |
|---|---|---|---|---|---|---|---|
| A | a1 | 100 | 100 | 100 | 100 | 0 | 0 |
|   | a2 | 0 | 0 | 0 | 0 | 100 | 0 |
|   | a3 | 0 | 0 | 0 | 0 | 0 | 100 |
| B | b1 | 8 | 8 | 8 | 8 | 8 | 8 |
|   | b2 | 0 | 0 | 0 | 0 | 0 | 0 |

TABLE 1-continued

| Component | | Example 1 | Example 2 | Example 3 | Example 4 | Example 5 | Example 6 |
|---|---|---|---|---|---|---|---|
| C | c1 | 25 | 0 | 0 | 0 | 0 | 0 |
|   | c2 | 0 | 25 | 0 | 0 | 0 | 0 |
|   | c3 | 0 | 0 | 25 | 0 | 25 | 25 |
|   | c4 | 0 | 0 | 0 | 25 | 0 | 0 |
|   | c5 | 0 | 0 | 0 | 0 | 0 | 0 |
|   | c6 | 0 | 0 | 0 | 0 | 0 | 0 |
|   | c7 | 0 | 0 | 0 | 0 | 0 | 0 |
|   | c8 | 0 | 0 | 0 | 0 | 0 | 0 |
|   | c9 | 0 | 0 | 0 | 0 | 0 | 0 |
| Comparison | c'1 | 0 | 0 | 0 | 0 | 0 | 0 |
|   | c'2 | 0 | 0 | 0 | 0 | 0 | 0 |
|   | c'3 | 0 | 0 | 0 | 0 | 0 | 0 |
|   | c'4 | 0 | 0 | 0 | 0 | 0 | 0 |
| Storage stability test | | ○ | ○ | ○ | ○ | ○ | ○ |
| Close adhesion test of cured product to PC | | ○ | ◎ | ◎ | ○ | ◎ | ◎ |

TABLE 2

| Component | | Example 7 | Example 8 | Example 9 | Example 10 | Example 11 | Example 12 |
|---|---|---|---|---|---|---|---|
| A | a1 | 100 | 100 | 100 | 100 | 100 | 100 |
|   | a2 | 0 | 0 | 0 | 0 | 0 | 0 |
|   | a3 | 0 | 0 | 0 | 0 | 0 | 0 |
| B | b1 | 0 | 8 | 8 | 8 | 8 | 8 |
|   | b2 | 8 | 0 | 0 | 0 | 0 | 0 |
| C | c1 | 0 | 0 | 0 | 0 | 0 | 0 |
|   | c2 | 0 | 0 | 0 | 0 | 0 | 0 |
|   | c3 | 25 | 0 | 0 | 0 | 0 | 0 |
|   | c4 | 0 | 0 | 0 | 0 | 0 | 0 |
|   | c5 | 0 | 25 | 0 | 0 | 0 | 0 |
|   | c6 | 0 | 0 | 25 | 0 | 0 | 0 |
|   | c7 | 0 | 0 | 0 | 25 | 0 | 0 |
|   | c8 | 0 | 0 | 0 | 0 | 25 | 0 |
|   | c9 | 0 | 0 | 0 | 0 | 0 | 25 |
| Comparison | c'1 | 0 | 0 | 0 | 0 | 0 | 0 |
|   | c'2 | 0 | 0 | 0 | 0 | 0 | 0 |
|   | c'3 | 0 | 0 | 0 | 0 | 0 | 0 |
|   | c'4 | 0 | 0 | 0 | 0 | 0 | 0 |
| Storage stability test | | ○ | ○ | ○ | ○ | ○ | ○ |
| Close adhesion test of cured product to PC | | ◎ | ◎ | ◎ | ◎ | ◎ | ○ |

TABLE 3

| Component | | Comparative Example 1 | Comparative Example 2 | Comparative Example 3 | Comparative Example 4 | Comparative Example 5 |
|---|---|---|---|---|---|---|
| A | a1 | 100 | 100 | 100 | 100 | 100 |
|   | a2 | 0 | 0 | 0 | 0 | 0 |
|   | a3 | 0 | 0 | 0 | 0 | 0 |
| B | b1 | 8 | 8 | 8 | 8 | 8 |
|   | b2 | 0 | 0 | 0 | 0 | 0 |
| C | c1 | 0 | 0 | 0 | 0 | 0 |
|   | c2 | 0 | 0 | 0 | 0 | 0 |
|   | c3 | 0 | 0 | 0 | 0 | 0 |
|   | c4 | 0 | 0 | 0 | 0 | 0 |
|   | c5 | 0 | 0 | 0 | 0 | 0 |
|   | c6 | 0 | 0 | 0 | 0 | 0 |
|   | c7 | 0 | 0 | 0 | 0 | 0 |
|   | c8 | 0 | 0 | 0 | 0 | 0 |
|   | c9 | 0 | 0 | 0 | 0 | 0 |
| Comparison | c'1 | 0 | 25 | 0 | 0 | 0 |
|   | c'2 | 0 | 0 | 25 | 0 | 0 |
|   | c'3 | 0 | 0 | 0 | 25 | 0 |
|   | c'4 | 0 | 0 | 0 | 0 | 25 |
| Storage stability test | | ○ | ○ | X | X | ○ |
| Close adhesion test of cured product to PC | | X | X | Not measured | Not measured | Unmeasurable |

As shown in the above Tables 1 and 2, it was confirmed that the curable resin composition according to Examples 1 to 12 of the present invention had both storage stability and close adhesion of the cured product to a polycarbonate.

Meanwhile, the curable resin composition according to Comparative Example 1 in Table 3 was a composition which did not include the component (C) according to the curable resin composition of the present invention, and it was confirmed that the composition had poor close adhesion of the cured product to a polycarbonate.

Comparative Example 2 was a composition using isonornylacrylate which is a (meth)acrylate compound being out of the range of the component (C), instead of the component (C) according to the curable resin composition of the present invention. It was confirmed that the composition had poor close adhesion of the cured product to a polycarbonate.

In addition, the curable resin compositions according to Comparative Example 3 and Comparative Example 4 were compositions using 2-hydroxyethylacrylate and 2-hydroxypropylacrylate, respectively which are (meth)acrylate compounds being out of the range of the component (C), instead of the component (C) according to the curable resin composition of the present invention. It was confirmed that these compositions had poor storage stability.

In addition, the curable resin composition according to Comparative Example 5 was a composition using 2-isocyanatoethylmethacrylate being out of the range of the component (C), instead of the component (C) according to the curable resin composition of the present invention. The composition was not cured at low temperature, so that the close adhesion test to a polycarbonate was not able to be performed.

Examples 13 to 25 and Comparative Example 6

In order to prepare each curable resin composition of Examples 13 to 25 and Comparative Example 6, the following component (D) was further prepared, in addition to the component (A), the component (B), and the component (C). Here, Example 25 may be considered as a reference example for confirming the effect of the component (D) of Example 13 to 24.

<Component (D)> d1: 3-glycidoxypropyltrimethoxysilane (KBM-403, manufactured by Shin-Etsu Chemical Co., Ltd.), d2: bisphenol F type epoxy resin (jER (registered trademark) 807, manufactured by Mitsubishi Chemical Corporation).

The method of producing each curable resin composition of Example 13 to 25 and Comparative Example 6 was as follows. First, the component (A) and the component (B) were weighed, and stirred for 30 minutes by an agitator. Next, other components (in the present preparation, the component (C) and the component (D)) were weighed and further added to the agitator, and then the mixture was further stirred for 30 minutes while being defoamed under vacuum, thereby producing a curable resin composition. Here, detailed preparation amount of each component followed the following Tables 4 to 6. In addition, the numerical values in the following Tables 4 to 6 are all expressed as parts by mass.

For each curable resin composition of Example 13 to 25 and Comparative Example 6, the following test was performed.

<Confirmation Test of Storage Stability>

To a glass vial having a volume of 20 ml, each curable resin composition was added and allowed to stand in a room set at 25° C. for 7 days with the lid closed. Thereafter, each curable resin composition was brought into contact with a rod having a sharp tip to confirm flowability, and evaluation was performed based on the following criteria. The results are shown in the following Table 4.

[Evaluation Criteria]

○ (good): flowability being confirmable, x (poor): not flowable due to gelation.

<Close Adhesion Test of Cured Product to Polycarbonate (PC) (after Moisture Resistance Test)>

Two sheets of polycarbonate specimens having a thickness of 5 mm×a width of 25 mm×a length of 50 mm were bonded to each other with each curable resin composition so that the specimens were crossed to each other. Next, each laminate in which the polycarbonate specimen (first adherend), the curable resin composition, and the polycarbonate specimen (second adherend) were laminated in this order was heated at 80° C. for 30 minutes, with each fixed with a jig, and thereafter, each laminate was placed in a high temperature and high humidity tank set at 60° C. under a relative humidity of 95% RH for 96 hours, and taken out of the high temperature and high humidity tank, allowed to stand at room temperature for 1 hour, thereby manufacturing each test piece. Here, each test piece had a structure in which the surfaces of the first adherend and the second adherend and the surfaces of the cured product were adhered to each other, and the cured product became an adhesive layer adhering two adherends. Then, each test piece was pressed by a cross head using a tensile tester until the two polycarbonate specimens (adherends) were separated. Thereafter, the fractured state of the adhesive layer (cured product) on each adherend was observed to perform evaluation based on the following criteria. In addition, a strength (MPa) of each test piece was measured by the tensile tester. The evaluation results and the strength (MPa) measured by the tensile tester are shown in the following Tables 4 to 6. In addition, in the present test, when the adhesive layer had higher close adhesive force, cohesive failure was caused, and when the adhesive layer had lower close adhesive force, interfacial fracture was caused. As an evaluation result, ○ or ◎ is preferred from the viewpoint of practicality. In addition, in the present invention, the strength measured by the tensile tester is not particularly limited, but a strength of 1.0 MPa or more is particularly preferred.

[Evaluation Criteria]

◎ (excellent): the adhesive layer was in a cohesive failure state as a whole,

○ (good): the adhesive layer had a portion of cohesive failure and a portion of interfacial fracture, x (poor): the adhesive layer was in an interfacial fracture state as a whole.

TABLE 4

| | Component | | Example 13 | Example 14 | Example 15 | Example 16 | Example 17 |
|---|---|---|---|---|---|---|---|
| A | | a1 | 100 | 100 | 100 | 100 | 100 |
| B | | b1 | 8 | 8 | 8 | 8 | 8 |
| C | | c1 | 3 | 0 | 0 | 0 | 0 |

TABLE 4-continued

| Component | | Example 13 | Example 14 | Example 15 | Example 16 | Example 17 |
|---|---|---|---|---|---|---|
| | c3 | 0 | 3 | 3 | 0 | 0 |
| | c5 | 0 | 0 | 0 | 3 | 0 |
| | c6 | 0 | 0 | 0 | 0 | 3 |
| | c7 | 0 | 0 | 0 | 0 | 0 |
| | c8 | 0 | 0 | 0 | 0 | 0 |
| | c9 | 0 | 0 | 0 | 0 | 0 |
| D | d1 | 1.5 | 1.5 | 0 | 1.5 | 1.5 |
| | d2 | 0 | 0 | 1.5 | 0 | 0 |
| Storage stability test | | ○ | ○ | ○ | ○ | ○ |
| Close adhesion test of cured product to PC (after a moistureresistance test) | Failure state | ○ | ○ | ○ | ○ | ○ |
| | Strength (MPa) | 3.2 | 3.6 | 1.4 | 3.2 | 4 |

TABLE 5

| | | Example 18 | Example 19 | Example 20 | Example 21 | Example 22 |
|---|---|---|---|---|---|---|
| A | a1 | 100 | 100 | 100 | 100 | 100 |
| B | b1 | 8 | 8 | 8 | 8 | 8 |
| C | c1 | 0 | 0 | 0 | 0 | 0 |
| | c3 | 0 | 0 | 0 | 0 | 0 |
| | c5 | 0 | 0 | 0 | 0 | 0 |
| | c6 | 3 | 0 | 0 | 0 | 0 |
| | c7 | 0 | 3 | 0 | 0 | 0 |
| | c8 | 0 | 0 | 3 | 6 | 9 |
| | c9 | 0 | 0 | 0 | 0 | 0 |
| D | d1 | 0 | 1.5 | 1.5 | 1.5 | 1.5 |
| | d2 | 1.5 | 0 | 0 | 0 | 0 |
| Storage stability test | | ○ | ○ | ○ | ○ | ○ |
| Close adhesion test of cured product to PC (after a moisture resistancetest) | Failure state | ○ | ○ | ○ | ○ | ○ |
| | Strength (MPa) | 1.3 | 2.2 | 1.7 | 1.9 | 3.3 |

TABLE 6

| | | Example 23 | Example 24 | Comparative Example 6 | Example 25 |
|---|---|---|---|---|---|
| A | a1 | 100 | 100 | 100 | 100 |
| B | b1 | 8 | 8 | 8 | 8 |
| C | c1 | 0 | 0 | 0 | 3 |
| | c3 | 0 | 0 | 0 | 0 |
| | c5 | 0 | 0 | 0 | 0 |
| | c6 | 0 | 0 | 0 | 0 |
| | c7 | 0 | 0 | 0 | 0 |
| | c8 | 6 | 0 | 0 | 0 |
| | c9 | 0 | 3 | 0 | 0 |
| D | d1 | 3.0 | 1.5 | 3.0 | 0 |
| | d2 | 0 | 0 | 0 | 0 |
| | | ○ | ○ | ○ | ○ |
| Close adhesion test of cured product to PC (after a moisture resistance test) | Failure state | ○ | ○ | x | ○ |
| | Strength (MPa) | 3.4 | 3 | 4.3 | 0.8 |

As shown in the above Tables 4 to 6, it was confirmed that the curable resin compositions according to Examples 13 to 24 of the present invention had both storage stability and close adhesion of the cured product to a polycarbonate (after a moisture resistance test).

Meanwhile, the curable resin composition according to Comparative Example 6 of Table 6 was a composition which did not include the component (C) according to the curable resin composition of the present invention, and it was confirmed that the composition had an unpreferred failure state of the close adhesion of the cured product to a polycarbonate (after a moisture resistance test).

In addition, it was confirmed that the curable resin compositions according to Examples 13 to 24 including the component (D) of Tables 4 to 6 had stronger close adhesion of the cured product to a polycarbonate (after a moisture resistance test), as compared with the curable resin composition according to Example 25 not including the component (D) of Table 6.

INDUSTRIAL APPLICABILITY

The present invention relates to a curable resin composition having excellent storage stability and close adhesion to a polycarbonate and the cured product thereof, a bonded body including the cured product and an adherend, and a production method thereof. In addition, the present invention relates to a curing method of the curable resin composition. From this, the present invention can be widely applied as an adhesive, a sealing agent, a coating agent, a casting agent, and the like in various field such as electrical and electronic fields, a transportation equipment field, a general adhesion field, and the like.

This application is based on Japanese Patent Application No. 2016-187668, filed in Japan on Sep. 27, 2016, the disclosure content of which is hereby incorporated as its entirety by reference.

The invention claimed is:

1. A curable resin composition comprising the following:
component (A): an isocyanate group-containing urethane prepolymer, component (B): a powder of a polyamine compound which is solid at 25° C., and component (C): at least one selected from the group consisting of a monofunctional (meth)acrylate compound having an alicyclic structure, a monofunctional (meth)acrylate compound having an aromatic ring, a monofunctional (meth)acrylate compound having a hydrolyzable silyl group, and a polyfunctional (meth)acrylate compound, wherein the composition does not substantially comprise a photoradical initiator, wherein a content of a photoradical initiator is less than 1% by mass based on the total mass of the curable resin composition, wherein the monofunctional (meth)acrylate compound having an alicyclic structure is at least one selected from the group consisting of cyclohexyl (meth)acrylate, dicyclopentanyl (meth)acrylate, dicyclopentenyl (meth)acrylate, dicyclopentenyloxy (meth)acrylate, isobornyl (meth)acrylate, and adamantyl (meth)acrylate, wherein the monofunctional (meth)acrylate compound having an aromatic ring is at least one selected from the group consisting of phenoxyethyl (meth)acrylate, benzyl (meth)acrylate, phenyl (meth)acrylate, phenoxydiethyleneglycol (meth)acrylate, phenoxytetraethyleneglycol (meth)acrylate, and nonylphenoxyethyl (meth)acrylate, wherein the monofunctional (meth)acrylate compound having a hydrolyzable silyl group is at least one selected from the group consisting of 3-(meth)acryloxypropyltrimethoxysilane, 3-(meth) acryloxypropyltriethoxysilane, 3-(meth)acryloxypropylmethyldimethoxysilane, and 3-(meth)acryloxypropylmethyldiethoxysilane, and wherein the polyfunctional (meth)acrylate compound is at least one selected from the group consisting of 1,4-butanediol di(meth)acrylate, 1,6-hexanediol di(meth)acrylate, 1,9-nonanediol di(meth)acrylate, 1, 10-decanediol di(meth)acrylate, dipropyleneglycol di(meth)acrylate, tripropyleneglycol di(meth)acrylate, polypropyleneglycol di(meth)acrylate, neopentylglycol di(meth)acrylate, polytetramethyleneglycol di(meth)acrylate, neopentylglycoladipate di(meth)acrylate, hydroxypivalic acid neopentylglycol di(meth)acrylate, dicyclopentanyl di(meth)acrylate, dimethyloltricyclodecane di(meth)acrylate, caprolactone modified dicyclopentenyl di(meth)acrylate, ethyleneoxide modified phosphoric acid di(meth)acrylate, isocyanurate di(meth)acrylate, allylated cyclohexyldi(meth)acrylate, isocyanuric acid ethylene oxide modified di(meth)acrylate, pentaerythritol tri(meth)acrylate, dipentaerythritol tri(meth)acrylate, propionic acid modified dipentaerythritol tri(meth)acrylate, trimethylolpropane triacrylate, ethyleneoxide modified trimethylolpropane tri(meth)acrylate, propyleneoxide modified trimethylolpropane tri(meth)acrylate, tris(acryloxyethyl)isocyanurate, isocyanuric acid ethylene oxide modified tri(meth)acrylate, pentaerythritoltetra(meth)acrylate, ditrimethylolpropanetetra(meth)acrylate, dipentaerythritolpenta(meth)acrylate, propionic acid modified dipentaerythritolpenta(meth)acrylate, dipentaerythritolhexa(meth)acrylate, caprolactone modified dipentaerythritolhexa(meth)acrylate, dipentaerythritolpenta(meth)acrylate, propionic acid modified dipentaerythritolpenta(meth)acrylate, dipentaerythritolhexa(meth)acrylate, and caprolactone modified dipentaerythritolhexa(meth)acrylate.

2. The curable resin composition according to claim 1, wherein the component (A) is a reaction product of a polyol compound (a-1) and a polyisocyanate compound (a-2).

3. The curable resin composition according to claim 1, wherein the component (B) has an average particle diameter of 0.1 to 100 μm.

4. The curable resin composition according to claim 1, wherein the component (B) is at least one compound selected from the group consisting of an aliphatic polyamine compound, an alicyclic polyamine compound, an aromatic polyamine compound, and a hydrazide compound.

5. The curable resin composition according to claim 1, wherein the component (B) is comprised at 0.1 to 100 parts by mass, based on 100 parts by mass of the component (A).

6. The curable resin composition according to claim 1, wherein the polyfunctional (meth)acrylate compound is at least one selected from the group consisting of isocyanuric acid ethylene oxide modified di(meth)acrylate, trimethylolpropane triacrylate, and isocyanuric acid ethylene oxide modified tri(meth)acrylate.

7. The curable resin composition according to claim 1, further comprising a compound having a glycidyl group as a component (D).

8. The curable resin composition according to claim 7, wherein the compound having a glycidyl group is a compound having an alkoxysilyl group and a glycidyl group in the molecule.

9. The curable resin composition according to claim 7, wherein the compound having a glycidyl group is at least one compound selected from the group consisting of 2-(3, 4-epoxycyclohexyl)ethyltrimethoxysilane, 3-glycidoxypropylmethyldimethoxysilane, 3-glycidoxypropyltrimethoxysilane, 3-glycidoxypropylmethyldiethoxysilane, and 3-glycidoxypropyltriethoxysilane.

10. The curable resin composition according to claim 7, wherein a combining amount of the component (D) is 0.1 to 10 parts by mass based on 100 parts by mass of the component (A).

11. A cured product of the curable resin composition according to claim 1.

12. A bonded body wherein a first adherend, the cured product according to claim 11, and a second adherend are laminated in this order, such that a surface of the first adherend and a surface of the cured product are adhered to each other, and a surface of the second adherend and a surface of the cured product are adhered to each other.

* * * * *